Figure 1:
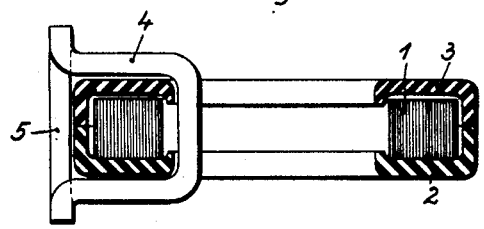

Oct. 2, 1956 P. DUFFING 2,765,448
SATURABLE SWITCHING REACTOR
Filed May 8, 1951

Inventor:
Paul Duffing
By Knight Bros.
Attorneys

United States Patent Office 2,765,448
Patented Oct. 2, 1956

2,765,448

SATURABLE SWITCHING REACTOR

Paul Duffing, Berlin-Siemensstadt, Germany, assignor to Siemens-Schuckertwerke, Aktiengesellschaft, Berlin-Siemensstadt, Germany, a corporation of Germany Application May 8, 1951, Serial No. 225,229

Claims priority, application Germany May 26, 1950

6 Claims. (Cl. 336—221)

My invention relates to saturable switching reactors. Such reactors are used in alternating-current circuits, usually in connection with a switching or other circuit controlling apparatus, and have the purpose of imposing upon the time characteristic of the alternating current a flattening distortion at or near the moments when the current wave passes through its zero values. The circuit can then be opened or closed during an extended weak-current interval within which the instantaneous current magnitude is kept low enough to prevent or subdue arcing and sparking tendencies, thus reducing the duty imposed upon the switch or other control apparatus.

To secure such a performance, the switching reactors have a saturable core magnetically linked with the reactor winding. During most of the wave period of the alternating current flowing through the winding, the core is saturated so that the reactance of the winding is at a minimum and thte effect of the reactor upon the configuration of the current wave not appreciable or wholly negligible. Near the current-zero passages, however, when the instantaneous current intensity drops below the saturation value of the reactor, the core is temporarily unsaturated so that the reactance of the reactor rises abruptly thus depressing the current magnitude and producing the flattened or stepped current characterstic abovementioned.

It has become known to give switching reactors a laminated iron core wound of sheet metal strip material. Such a wound annular core is mechanically sensitive and hence must be inserted into a stiff annular housing which protects the core from being mechanically deformed when the reactor winding is being mounted upon it. The core housing cannot be made completely of metal because it would short circuit the winding turns. In the known designs, therefore, only the peripheral side walls of the housing are made of metal, such as aluminum, while the axial housing sides are covered by annular lids of fibrous plastic material. Since the winding has an electric potential against the core, the composite metal-plastic housing is bandaged before mounting the insulated winding upon it.

It is an object of my invention to improve reactors of the abovementioned general type by permitting a higher current density in the reactor winding and/or a shorter iron length of the core thus affording an improved efficiency of a reactor of given size or a reduction in reactor size for a given current load. Another object of my invention is to improve the manufacture and design of the reactors by eliminating the necessity of using insulated winding conductors and obviating the possibility of short-circuiting the winding through the housing.

According to the invention, I enclose the toroidal or annular core of the reactor, preferably a laminated core wound of strip material, within a toroidal or annular housing of ceramic material and mount the preferably bare winding upon the housing. The winding, according to another feature of the invention, is composed of individual turn elements and placed edgewise upon the housing.

Figure 2:
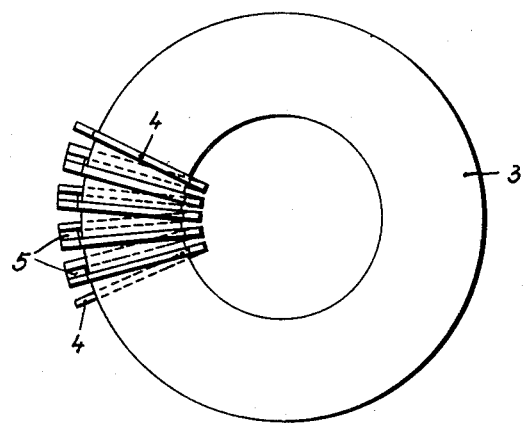
Figure 3:
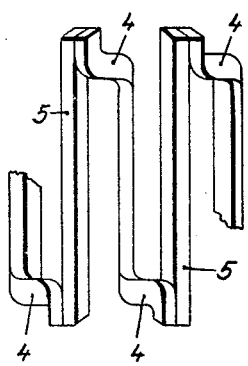

An embodiment of a switching reactor according to the invention is illustrated on the drawing in which Fig. 1 is an axial section through the reactor showing only one of its winding turns;

Fig. 2 is a top view of the reactor, showing only a few of the winding turns; and Fig. 3 is a perspective and schematic view of part of the winding.

The illustrated switching reactor has a toroidal iron core wound of strip material. The core is inserted into a ceramic housing of annular shape composed of two half shells 2 and 3. The housing material may consist of porcelain, steatite or aluminum oxide material, preferably moulded and fired in accordance with customary ceramic methods, and hence is rigid, insulating, inorganic and refractory.

The bare, i. e. non-insulted, winding is placed edgewise upon the ceramic housing. The winding is composed of individual stirrup portions 4 which are interconnected by straight bridge pieces 5 so as to form a continuous coil around core and housing. The bridge pieces 5 extend parallel to the core axis at the outer periphery of the housing and are firmly joined with the stirrup piece 4, for instance, by welding or hard soldering or by screws. The provision of the stirrup-shaped portions 4 eliminates the necessity of joining the individual turn elements by a connecting wire to be threaded through the individual pieces. The ceramic housing may be equipped with grooves to be engaged by the stirrup pieces 4. If desired, each alternate stirrup piece may be insulated by an enamel coating, preferably only on the areas within the hollow of the annular core.

The winding of a reactor according to the invention may be given a current load of much higher magnitude than permissible with switching reactors of the known design. A further increase in current loading can be obtained by providing a forced cooling for the winding, for instance, with forced air or liquid cooling.

By virtue of the fact that the winding of a reactor according to the invention may normally operate at a temperature considerably above the limits of fibrous materials, a correspondingly high current loading is permissible and the iron length of the core can be made smaller than heretofore necessary. This has the advantage of also reducing the residual current during the weak-current intervals of the reactors.

I claim:

1. A saturable switching reactor, comprising a toroidal housing of ceramic material, a wound core of magnetizable sheet metal and toroidal shape concentrically disposed in said housing, and a bare reactor winding of strip material arranged edgewise about said housing and consisting of a plurality of U-shaped sheet metal portions and a plurality of straight portions, said U-shaped portions being engaged in embracing relationship with the top, bottom and inner surfaces of said housing, and said plurality of straight portions being adjacent the outer peripheral surface of said housing and interconnecting ends of alternate ones of the U-shaped portions, whereby the interconnections thus produced are at points along the outer periphery of said housing.

2. A saturable switching reactor comprising an annular magnetic core, an annular ceramic insulating shell surrounding said core, and an electric winding of strip material surrounding and carried by said shell, said strip material winding being arranged edgewise about said shell, said winding comprising a plurality of interconnected bare metallic coils, each of said coils having a U-shaped portion fitted about said annular shell from within to embrace the inner and end surfaces thereof, and a straight portion lying adjacent the outer surface of said shell and having its ends each interconnecting one end each of adjacent pairs of said U-shaped portions.

3. A saturable switching reactor comprising an annular magnetic core, an annular ceramic insulating shell surrounding said core, said shell being divided along a central plane perpendicular to the axis of revolution thereof to provide a pair of complementary half-shells, and an electric winding of strip material surrounding and carried by said shell, said strip material winding being arranged edgewise about said shell, said winding comprising a plurality of interconnected bare metallic coils, each of said coils having a U-shaped portion fitted about said annular shell from within to embrace the inner and end surfaces thereof, and a straight portion lying adjacent the outer surface of said shell and having its ends each interconnecting one end each of adjacent pairs of said U-shaped portions.

4. A saturable switching reactor comprising an annular magnetic core, an annular ceramic insulating housing surrounding said core, and an electric winding of strip material surrounding and carried by said housing, said strip material winding being arranged edgewise about said housing, said winding comprising a plurality of interconnected bare metallic coils, each of said coils having a U-shaped portion fitted about said annular housing from within to embrace the inner and end surfaces thereof, and a straight portion lying adjacent the outer surface of said housing and having its ends each interconnecting one end each of adjacent pairs of said U-shaped portions, said interconnections being arranged peripherally about the outer annular surface of said housing.

5. A saturable switching reactor comprising an annular magnetic core, an annular ceramic insulating housing surrounding said core, and an electric winding of strip material surrounding and carried by said housing, said strip material winding being arranged edgewise about said housing, said winding comprising a plurality of interconnected bare metallic coils, each of said coils having a U-shaped portion fitted about said annular housing from within to embrace the inner and end surfaces thereof, said U-shaped portions having outwardly-bent, opposed ends, said coils each further comprising a straight portion lying adjacent the outer surface of said housing and having its ends each interconnecting one end each of adjacent pairs of said U-shaped portions.

6. A saturable switching reactor comprising an annular magnetic core, an annular ceramic insulating housing surrounding said core, and an electric winding of strip material surrounding and carried by said housing, said strip material winding being arranged edgewise about said housing, said winding comprising a plurality of interconnected bare metallic coils, each of said coils having a U-shaped portion fitted about said annular housing from within to embrace the inner and end surfaces thereof, said U-shaped portions having outwardly-bent, opposed ends, said opposed ends each being oppositely bent to lie in separate planes at one side each of the plane of symmetry of said U-shaped portions including the base thereof, said coils each further comprising a straight portion lying adjacent the outer surface of said housing and having its ends each interconnecting one end each of adjacent pairs of said U-shaped portions.

References Cited in the file of this patent

UNITED STATES PATENTS

| | | |
|---|---|---|
| 996,701 | Carroll | July 4, 1911 |
| 1,801,214 | Von Henke | Apr. 14, 1931 |
| 2,511,230 | Wald | June 13, 1950 |

FOREIGN PATENTS

| | | |
|---|---|---|
| 75,916 | Austria | Mar. 26, 1919 |
| 119,192 | Sweden | July 8, 1947 |
| 446,602 | Great Britain | May 4, 1936 |
| 535,978 | Germany | Oct. 19, 1931 |